United States Patent [19]
Tsuchihashi et al.

[11] Patent Number: 5,992,153
[45] Date of Patent: Nov. 30, 1999

[54] POWER UNIT FOR A VEHICLE

[75] Inventors: Yasunori Tsuchihashi, Susono; Takashi Izuo, Toyota, both of Japan

[73] Assignee: Toyota Jidosha Kabushiki Kaisha, Toyota, Japan

[21] Appl. No.: 09/182,323

[22] Filed: Oct. 30, 1998

[30] Foreign Application Priority Data

Nov. 10, 1997 [JP] Japan .................................. 9-307665

[51] Int. Cl.⁶ .................................................. F01B 21/04
[52] U.S. Cl. ............................................ 60/716; 180/65.4
[58] Field of Search ........................... 60/716, 717, 718; 180/65.1, 65.2, 65.3, 65.4; 123/2, 3

[56] References Cited

U.S. PATENT DOCUMENTS

| | | | |
|---|---|---|---|
| 3,894,605 | 7/1975 | Salvadorini | 180/65 R |
| 4,407,132 | 10/1983 | Kawakatsu et al. | 60/716 |
| 4,951,769 | 8/1990 | Kawamura | 60/716 X |
| 5,117,931 | 6/1992 | Nishida | 180/65.2 |
| 5,323,868 | 6/1994 | Kawashima | 180/65.4 |
| 5,327,992 | 7/1994 | Boll | 180/65.2 |
| 5,346,031 | 9/1994 | Gardner | 180/179 |

FOREIGN PATENT DOCUMENTS

| | | |
|---|---|---|
| 0 376 714 | 7/1990 | European Pat. Off. . |
| 0 698 521 | 2/1996 | European Pat. Off. . |
| 0 777 038 | 6/1997 | European Pat. Off. . |
| 6-33780 | 2/1994 | Japan . |
| 8-14074 | 1/1996 | Japan . |
| 8-93426 | 4/1996 | Japan . |

*Primary Examiner*—Hoang Nguyen
*Attorney, Agent, or Firm*—Oliff & Berridge, PLC

[57] ABSTRACT

In a power unit for a vehicle, an internal combustion engine, equipped with electromagnetic valves on the respective cylinders and a generator connected to the output shaft of the engine, is provided. The electromagnetic valves are controlled by an electromagnetic valve actuating device. The generator converts at least a part of the engine output into electric power. The generated electric power is stored in a battery. The electric power stored in the battery is supplied to a motor in order to drive the vehicle. A control unit controls the output of motor in accordance with the requirement of the driver of the vehicle. Since the engine is not directly controlled by the driver, the engine can be operated at a predetermined speed range regardless of the requirements of the driver. This speed range is selected so that the maximum reliability and durability of the electromagnetic valves can be obtained. Thus, the advantages of the electromagnetic valves such as a low mechanical loss can be obtained without causing the problems relating to the durability and reliability of the electromagnetic valves.

15 Claims, 14 Drawing Sheets

POWER UNIT FOR A VEHICLE

BACKGROUND OF THE INVENTION

1. Field of the Invention

The present invention relates to a power unit for a vehicle. More specifically, the present invention relates to a power unit which converts the output of an internal combustion engine having an electromagnetic valve actuating device into electric power and the vehicle is then driven using the converted electric power.

2. Description of the Related Art

An electromagnetic valve actuating device for actuating intake valves and/or exhaust valves of an internal combustion engine is known in the art. An electromagnetic valve actuating device actuates valves of an engine by means of electromagnetic actuators without using camshafts.

Japanese Unexamined Patent Publication (Kokai) No. 8-93426, for example, discloses an example of this type of the electromagnetic valve actuating device. The device in the '426 publication includes an armature disk made of a magnetic material and is attached to a stem of a valve element and a pair of springs which urge the armature disk to the directions opposite to each other. The device further includes an opening solenoid disposed on one side of the armature disk and a closing solenoid disposed on the other side of the armature disk. When both of the opening solenoid and the closing solenoid are deactivated, the valve element is kept between a fully opened position and a fully closed position by the urging forces of the springs exerting on both sides of the armature disk. However, when the opening solenoid is activated, since the armature disk is pulled to the opening solenoid, the valve element moves to the fully opened position. Similarly, when the closing solenoid is activated, the valve element moves to the fully closed position.

Therefore, the valves of the cylinders of an internal combustion engine can be operated by the electromagnetic valve actuating device by activating the opening solenoid and the closing solenoid alternatively in the manner synchronous with the operating cycle of the cylinder. Thus, the valves of an internal combustion engine can be operated without using camshafts.

In general, a mechanical power loss in the valve system caused by friction etc. becomes large when a camshaft is used for driving valves. Since the mechanical power loss of an electromagnetic valve actuating device is very small compared to that of a camshaft, the fuel efficiency and the performance of the engine can be improved by using an electromagnetic valve actuating device.

However, although the power loss of the electromagnetic valve actuating device is small, some problems arise when it is used for an engine of a vehicle.

For example, the vehicle engine is required to operate over a wide speed range from a very low speed to a very high speed. Since the electromagnetic valve actuating device drives a valve element having a mass by an electromagnetic actuator such as a solenoid, the actuating speed of the valve is limited. Therefore, when the engine is operated at a high speed, the electromagnetic valve actuating device cannot achieve a sufficient actuating speed and the movement of the valve elements cannot match the speed of the cycle of the cylinders.

Further, the performance of the electromagnetic valve actuating device, such as the durability and the reliability in the continuous high speed operation and response in the transient speed condition, is not sufficient at present.

SUMMARY OF THE INVENTION

The object of the present invention is to provide a means for utilizing the advantages of an electromagnetic valve actuating device to the maximum without causing the problems as set forth above, by combining a vehicle driven by electric power with an internal combustion engine equipped with an electromagnetic valve actuating device.

The object as set forth above is achieved by a power unit for a vehicle, according to the present invention, comprising an internal combustion engine, an electromagnetic valve actuating device which opens and closes at least one of the intake valve and the exhaust valve of the respective cylinders of the engine by means of electromagnetic actuators, conversion means for converting at least a part of the output power of the engine into electric power, power storage means for storing the electric power converted by the conversion means, driving means for converting the stored electric power into mechanical power for driving the vehicle and vehicle control means for controlling the driving means in order to adjust the power for driving the vehicle in accordance with the requirements of the driver of the vehicle.

According to the present invention, at least a part of the output of the internal combustion engine is converted into electric power by the conversion means and stored in the power storage means. The driving means converts the electric power stored in the power storage means into mechanical power for driving the vehicle. Further, the vehicle control means controls the driving means according to the requirements of the driver of the vehicle. In case of a vehicle where an internal combustion engine directly provides the mechanical power for driving the vehicle, since the vehicle control means such as an accelerator pedal directly controls the operating condition of the engine according to the requirement of the driver, the internal combustion engine is required to operate in a wide range of the engine speed. However, according to the present invention, since the internal combustion engine is not controlled directly by the driver, the engine can be always operated within a predetermined speed range regardless of the driving power required by the driver. Therefore, the electromagnetic valve actuating device is required to achieve a maximum durability and reliability only in this speed range, i.e., it is not necessary to consider an extreme high speed operation of the engine and a transient operation where the engine speed changes largely in a short time. Therefore, according to the present invention, the advantages of the electromagnetic valve actuating device can be utilized to the maximum without causing the problems as set forth above.

According to the present invention, either a part of the output power or all of the output power of the engine may be converted into electric power. Further, the electromagnetic valve actuating device may actuate either of the intake valves or the exhaust valves, or both.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the power unit according to the present invention will be explained with reference to FIGS. 1 through 14.

Figure 1:
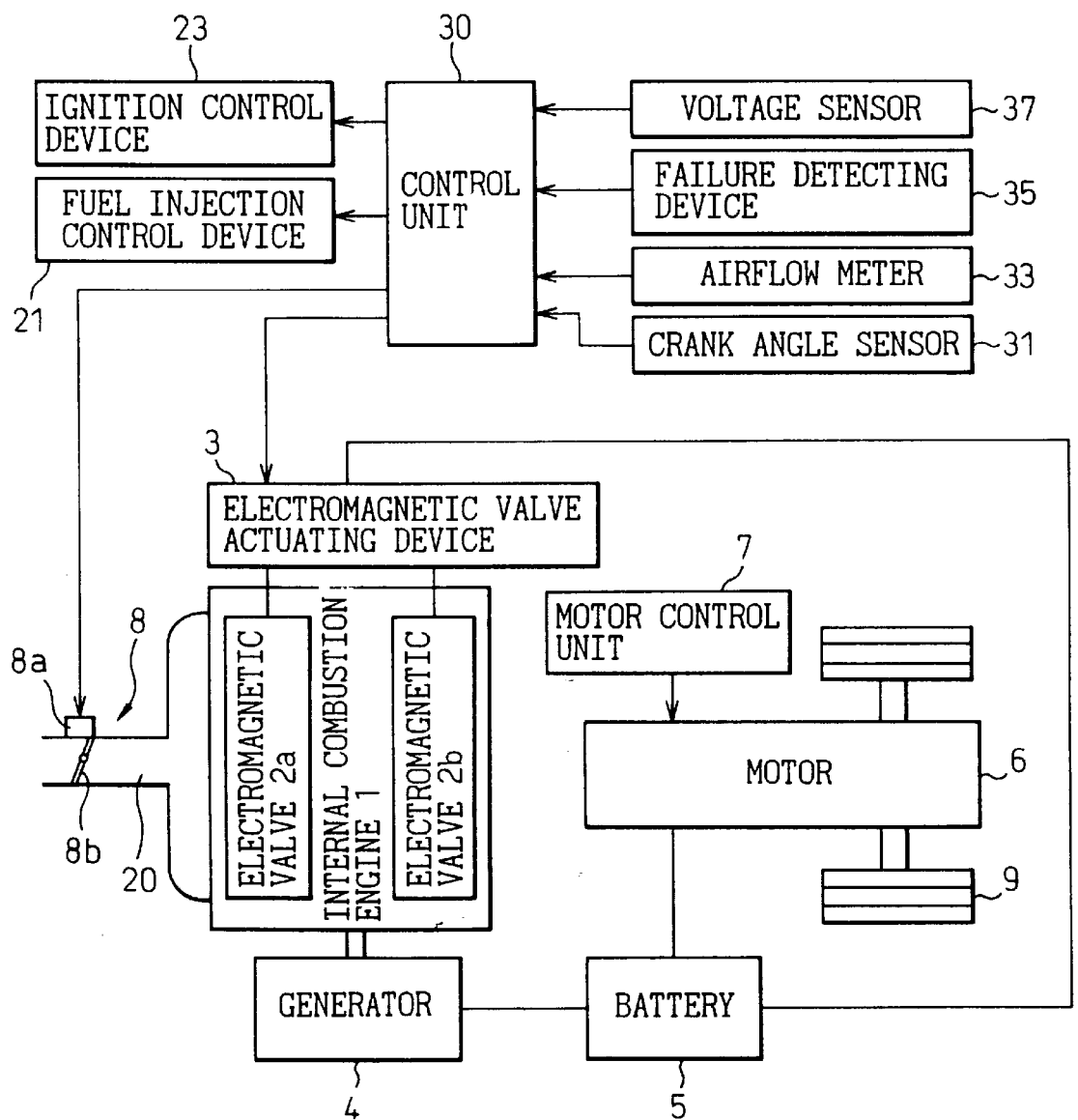
FIG. 1 schematically illustrates the general configuration of an embodiment of the power unit according to the present invention.

FIG. 1 schematically shows the general configuration of an embodiment of the power unit according to the present invention.

In FIG. 1, reference numeral 1 designates an internal combustion engine mounted on a vehicle. In this embodiment, a four-cylinder gasoline engine is used for the engine 1. The engine 1 is provided with electromagnetic intake valves 2a and electromagnetic exhaust valves 2b for each cylinder and an electromagnetic valve actuating device 3 for controlling the operation of the valves 2a and 2b. The construction of the electromagnetic valves 2a and 2b will be explained later.

The output shaft of the engine 1 is connected to a generator 4 which acts as the power conversion means for converting the output power of the engine 1 into electric power. The electric power converted by the generator 4 is supplied to and stored in a battery 5 which acts as the power storage means in this embodiment.

In this embodiment, electric motor 6 is used as the driving means, i.e., the electric motor 6 is supplied with electric power from the battery 5 and generates mechanical power to rotate the driving wheels 9 of the vehicle.

Further, in this embodiment, a motor control unit 7 which acts as the vehicle control means is provided. The motor control unit adjusts the electric power fed to the motor 6 in accordance with the amount of depression of an accelerator pedal (not shown) in order to adjust driving power of the vehicle in accordance with the requirement of the driver of the vehicle.

In this embodiment, electromagnetic valve actuating device 3 is supplied with electric power for operating the electromagnetic valves 2a and 2b from the battery. Therefore, a separate battery for supplying electricity to the electromagnetic valve actuating device 3 is not required in this embodiment.

Numeral 8 in FIG. 1 designates an electronic control throttle valve disposed in the intake air passage 20 of the engine 1. The electronic control throttle valve 8 includes a valve element 8b and an actuator 8a such as a stepper motor for operating the valve element 8b. The actuator 8a actuates the valve element 8b according to a control signal from a control unit 30 to adjust the degree of opening of the throttle valve 8 to a required value.

The control unit 30 may be constructed as a microcomputer of a known type. The control unit 30 in this embodiment acts as the operation control means for controlling the engine 1 in such a manner that the engine operating speed is kept within a predetermined range. More precisely, the control unit 30 adjusts the degree of opening of the throttle valve 8 and further adjusts the ignition timing and the fuel injection amount of the engine to keep the engine speed within the predetermined range.

Further, the control unit 30 controls the electromagnetic valve actuating device 3 to actuate the electromagnetic valves 2a and 2b synchronously with the operation cycle of the respective cylinder. As explained later, the control unit 30 further detects the failure of the electromagnetic valves 2a and 2b and, when the failure is detected, the control unit 30 stops the engine 1 and actuates the valves 2a and 2b in a predetermined operation pattern. The control unit 30 further monitors the amount of electric power stored in the battery 5 and terminates the operation of the engine 1 when the amount of the stored electric power has reached a predetermined value. Namely, the control unit 30 acts as the failure control means and the storage control means as well as the operation control means.

In order to perform these controls, a pulse signal representing the crankshaft rotation angle is fed to the control unit 30 from a crank angle sensor 31 disposed near the crankshaft of the engine 1. The control unit 30 calculates the engine-rotation speed (the engine speed) NE and the crank angle (the rotation angle of the crankshaft) CA based on the pulse signal. Further, a intake air signal from an airflow meter 33 disposed in the intake air passage 20 which represents the intake air flow and a battery voltage signal from a battery voltage sensor 37 which represents the terminal voltage VB of the battery 5 are supplied to the control unit 30. The battery terminal voltage VB is used as a parameter representing the amount of the electric power stored in the battery 5.

Further, a failure detecting device 35 for detecting the failure of the electromagnetic valves 2a and 2b is provided in this embodiment. As explained later, the failure detecting device 35 includes a knock sensor (such as a vibration sensor) and a valve position sensor. The failure detecting device 35 detects failure of the electromagnetic valves 2a and 2b, such as a loss of synchronism (changes in the open/close timing) and improper movement of the valve elements of the valves 2a and 2b, and generates a failure signal to the control unit 30.

The output port of the control unit 30 is connected to the electromagnetic valve actuating device 3, a fuel injection control device 21 and an ignition control device 23 in order to control the operation of the valves 2a and 2b, the fuel injection and the ignition timing of the engine 1, respectively.

Next, the electromagnetic valves 2a and 2b in this embodiment will be explained.

Figure 2:
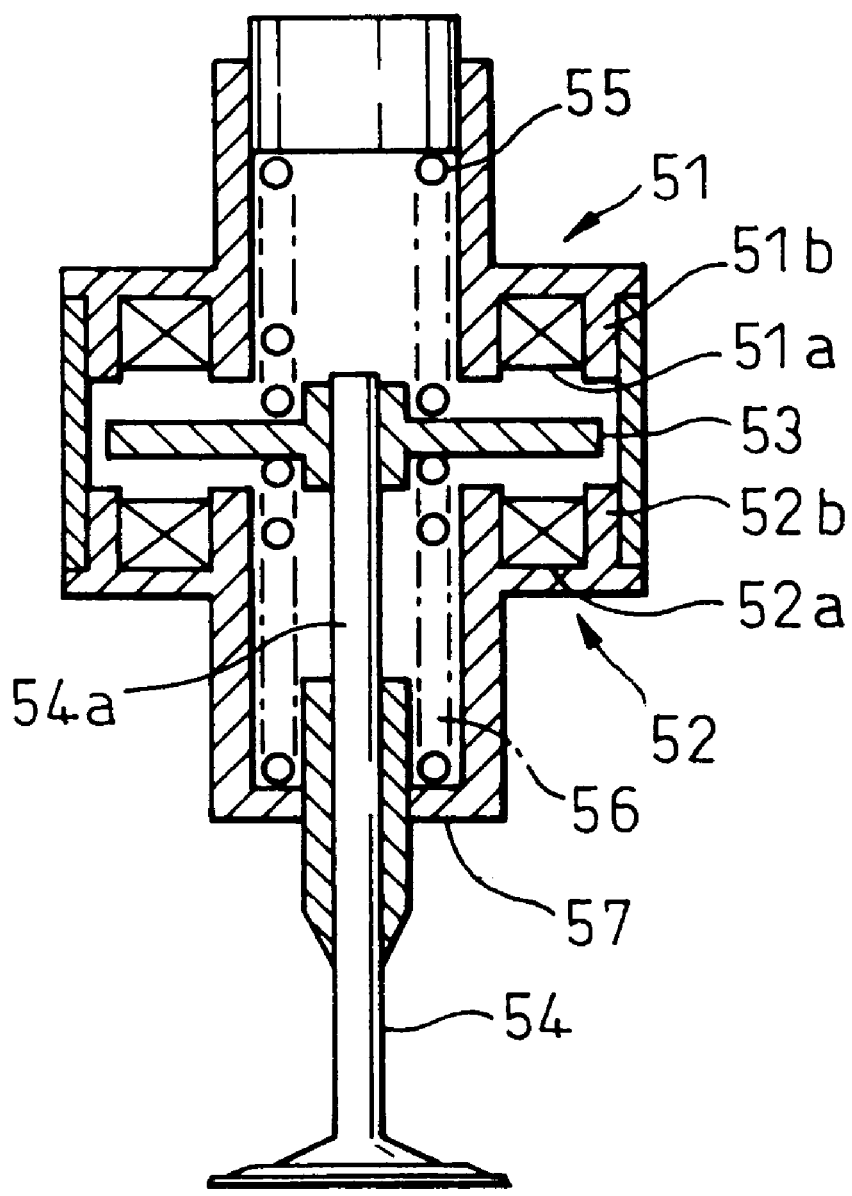
FIG. 2 is a cross-sectional drawing showing the general construction of an electromagnetic valve.

FIG. 2 is a cross-sectional drawing illustrating the general construction of an electromagnetic valve.

In FIG. 2, numeral 54 designates the valve element of an intake valve (or exhaust valve), 54a designates a valve stem of the valve element 54. An armature disk 53 made of magnetic material is fixed on the valve stem 54a. An electromagnet 51 for opening the valve and an electromagnet 52 for closing the valve are disposed on both sides of the armature disk 53 in such a manner that the electromagnet 51 and 52 oppose to the respective sides of the disk 53 with a predetermined clearances. The electromagnets 51 and 52 include solenoid 51a and 52a and, by energizing the solenoids 51a or 52a, the valve element moves to a valve opening position or a valve closing position, respectively. The valve element 54, the armature 53 and solenoids 51 and 52 are contained in a casing 57. The casing 57 further contains springs 55 and 56 which urge the armature disk 53 to the directions opposite to each other. When none of the solenoids 51 and 52 are energized, the valve element 54 is held at a middle between a fully opened position and a fully closed position by the urging forces of the springs 55 and 56.

The control unit 30 transmits a control signal to the electromagnetic valve actuating device in accordance with the crank angle signal. The electromagnetic valve actuating device 3 energizes the electromagnets 51 and 52 alternatively in accordance with the control signal so that the intake valves or the exhaust valves (or both) open and close at a predetermined timing matching the operation cycle of the respective cylinders. The open/close timing of the respective valves is determined by a control signal transmitted from the control unit 30.

The control unit 30 calculates the fuel injection amount and the ignition timing using any known method based on the engine speed NE calculated from the pulse signal from the crank angle sensor 31 and the intake air flow amount detected by the airflow meter 33. The control unit 30 further transmits control signals correspond to the calculated values of the fuel injection amount and the ignition timing to the fuel injection control device 21 and the ignition control device 23 in order to control the fuel injection amount and the ignition timing of the engine 1. In this embodiment, the control unit 30 further feedback controls the degree of opening of the throttle valve 8 by the actuator 8a so that the engine speed NE is maintained within a predetermined range (for example, 2500 to 3500 rpm).

The control range of the engine speed NE is selected in such a manner that the exhaust emission and the fuel consumption of the engine are minimized and the durability and the reliability of the electromagnetic valves are proven in the selected range. By selecting the engine speed control range in the manner noted above, the advantages of the electromagnetic valves 2a, 2b can be utilized to the maximum without causing the problems related to the response in the transient condition and the durability and the reliability.

Next, the actual control operations of the power unit in FIG. 1 will be explained with reference to FIGS. 3 through 7.

Figure 3:
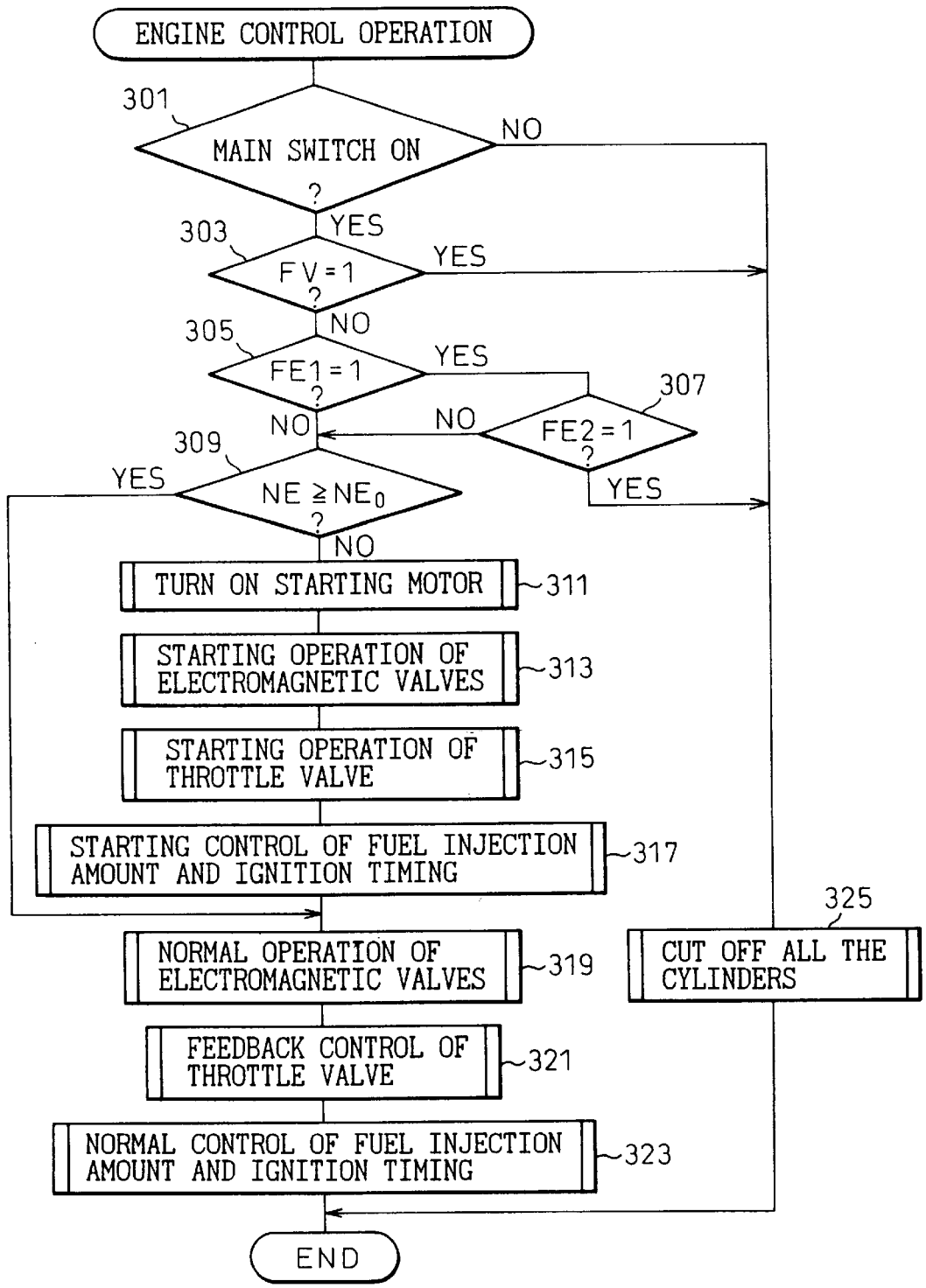
FIG. 3 is a flowchart illustrating an embodiment of the control operation of the engine.

FIG. 3 is a flowchart illustrating the control operation of the engine 1. This operation is performed by a routine executed by the control unit 30 at regular intervals.

In the operation in FIG. 3, starting operation (steps 309 through 317) and normal operation control (steps 319 through 323) are performed. Further, the engine 1 is stopped when the amount of the electric power stored in the battery 5 has reached a predetermined value, or when one of the electromagnetic valves 2a and 2b has failed (steps 303 through 307, step 325).

In FIG. 3, at step 301 the operation determines whether the main switch of the engine is at the ON position. Further, the operation examines the values of the flags FV, FE1 and FE2 at steps 303 through 307. The operation proceeds to step 309 only when the main switch is ON and the values of the flag FV and one of the flags FE1 and FE2 are set at 0. In other cases, the engine is stopped at step 325. Steps 303 through 307 and 325 will be explained later.

Steps 309 through 317 represent the engine starting operation. At step 309, the operation determines whether the engine 1 has started based on the engine speed NE. In this embodiment, it is determined that the engine 1 has started when the speed NE has reached a predetermined value $NE_0$ (for example, the value $NE_0$ is set at about 400 rpm).

If the engine has not started at step 309, the operation turns on the starter motor at step 311 in order to crank the engine 1. Further, the operation adjusts the valve timing of the electromagnetic valves 2a and 2b, the degree of opening of the throttle valve 8, the ignition timing and fuel injection amount to the values suitable for starting the engine 1 at steps 313 through 317. For example, at step 313, the closing timing of the intake valve 2a is delayed compared to the timing during the normal operation of the engine 1. This causes the intake valve 2a to close in the middle of the compression stroke of the cylinders and the actual compression ratio of the cylinders becomes lower. This facilitates the cranking of the engine during the starting operation. Further, at step 315, the degree of opening of the throttle valve 8 is reduced to a predetermined value. When the throttle valve 8 is partially closed, the pressure in the intake air passage 20 downstream of the throttle valve 8 becomes lower than the atmospheric pressure. This facilitates the evaporation of the fuel injected into the intake ports of the cylinders and, thereby, the startability of the engine is improved. At step 317, the fuel injection amount and the ignition timing of the engine 1 are adjusted to the values suitable for starting the engine. The operation in steps 311 through 317 is continued until the engine speed NE has reached the value $NE_0$ at step 309.

If the operation determines, at step 309, that the engine has started, the starter motor is turned off and steps 319 through 321 are performed. Namely, the valve timings of the electromagnetic valves 2a and 2b are adjusted to a suitable values matching the engine speed and the engine load (or intake air flow amount). At step 321, the degree of opening of the throttle valve 8 is feedback controlled based on the engine speed NE so that the engine speed is maintained within a predetermined range.

Figure 4:
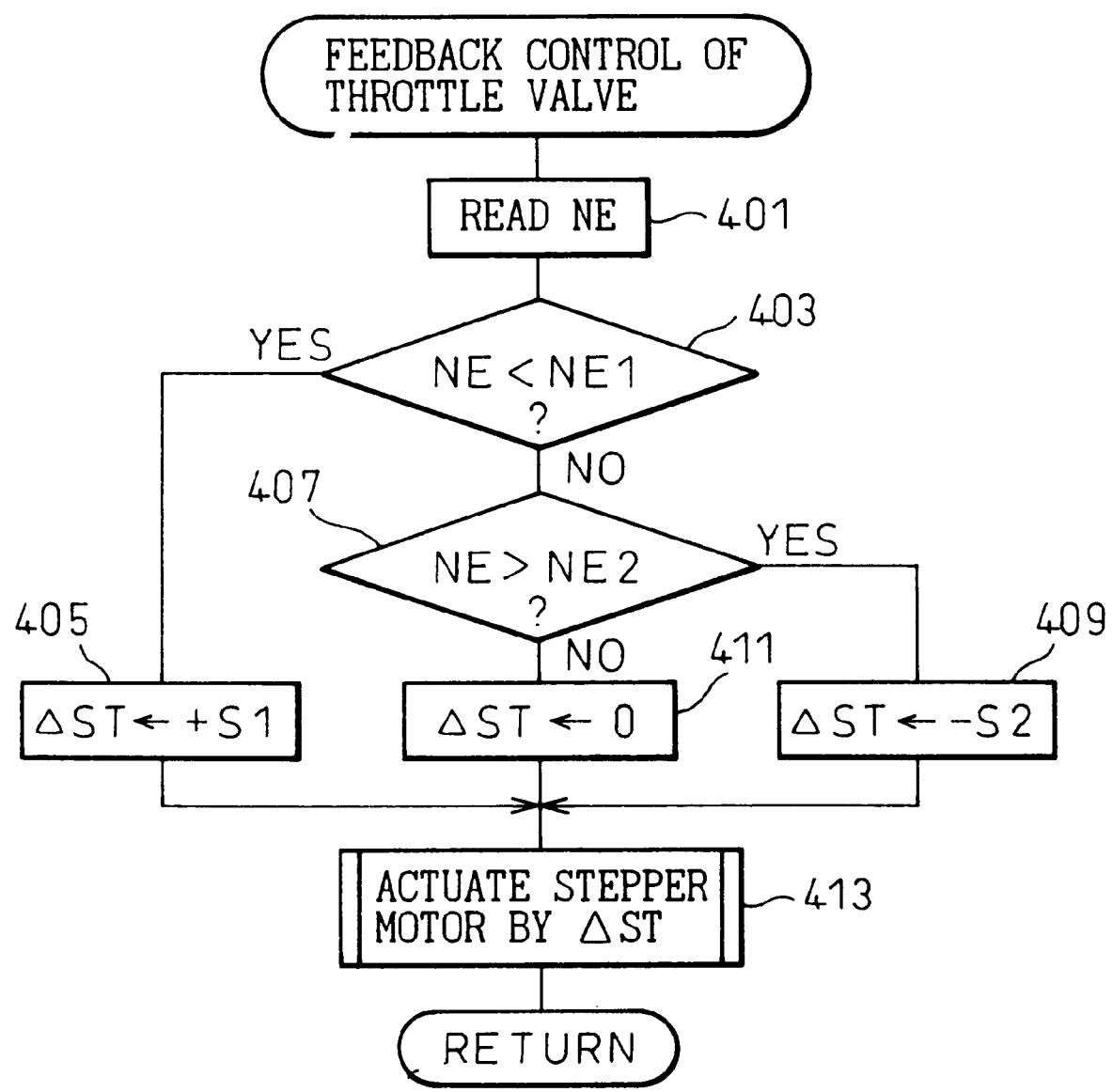
FIG. 4 is a flowchart illustrating an embodiment of the engine speed feedback control operation.

FIG. 4 is a flowchart illustrating the feedback control of the throttle valve 8 performed at step 321 in FIG. 3. In the feedback control operation in FIG. 4, the engine speed NE is read at step 401. At step 403, the operation determines whether the engine speed NE is lower than a predetermined first speed NE1 (for example, NE1 is set at about 2500 rpm) and, if NE<NE1, the amount of the change in the degree of opening of the throttle valve ΔST is set to a value +S1 (S1 is a positive constant). If NE≧NE1 at step 403, the operation determines whether the engine speed NE is higher than a predetermined second value NE2 at step 407. If NE>NE2 at step 407, the amount of the change in the degree of opening of the throttle valve ΔST is set to a value +S2 (S2 is a positive constant) at step 409. If NE≦NE2 at step 407, i.e., if the engine speed NE is in the range between NE1 and NE2, the value of ΔST is set to 0 at step 411. After setting the value of ΔST, the stepper motor 8a is actuated by the amount ΔST. Therefore, the degree of opening of the throttle valve 8 is increased by S1 when the engine speed NE is lower than NE1, and decreased by S2 when the engine speed NE is higher than NE2. Thus, the engine speed NE is always maintained within the range between NE1 and NE2.

After performing the feedback control of the throttle valve 8 at step 321, the fuel injection amount and the ignition timing are set at suitable values based on the engine speed and the engine load (the intake air flow amount) at step 323 in FIG. 1.

Next, the operations at steps 303 through 305 and 325 will be explained.

In this embodiment, the operation of the engine 1 is stopped when (a) the amount of the electric power stored in the battery 5 has reached a predetermined amount, or (b) the failure of one of the electromagnetic valves 2a, 2b is detected. Further, if the failure of the electromagnetic valve 2a or 2b is detected, the operation for determining whether the electromagnetic has recovered from the failure is performed, as explained later, after the engine is stopped and, if it is determined that the failed valve has recovered from the failure, the step 309 is performed again in order to start the engine 1.

Step 303 represents the operation for determining the amount of the electric power stored in the battery 5. In this embodiment, the amount of the electric power is determined in accordance with the value of the flag FV set by the operation in FIG. 5. As explained later, if the value of the flag FV is set at 1, since this means that the amount of the electric power stored in the battery 5 has reached a predetermined value, the operation performs step 325 to terminate the fuel injection and ignition of the engine. At step 325, the electromagnetic valves 2a and 2b of the respective cylinders are also stopped. Therefore, the electric power stored in the battery 5 is not consumed by the electromagnetic valves 2a and 2b.

Figure 5:
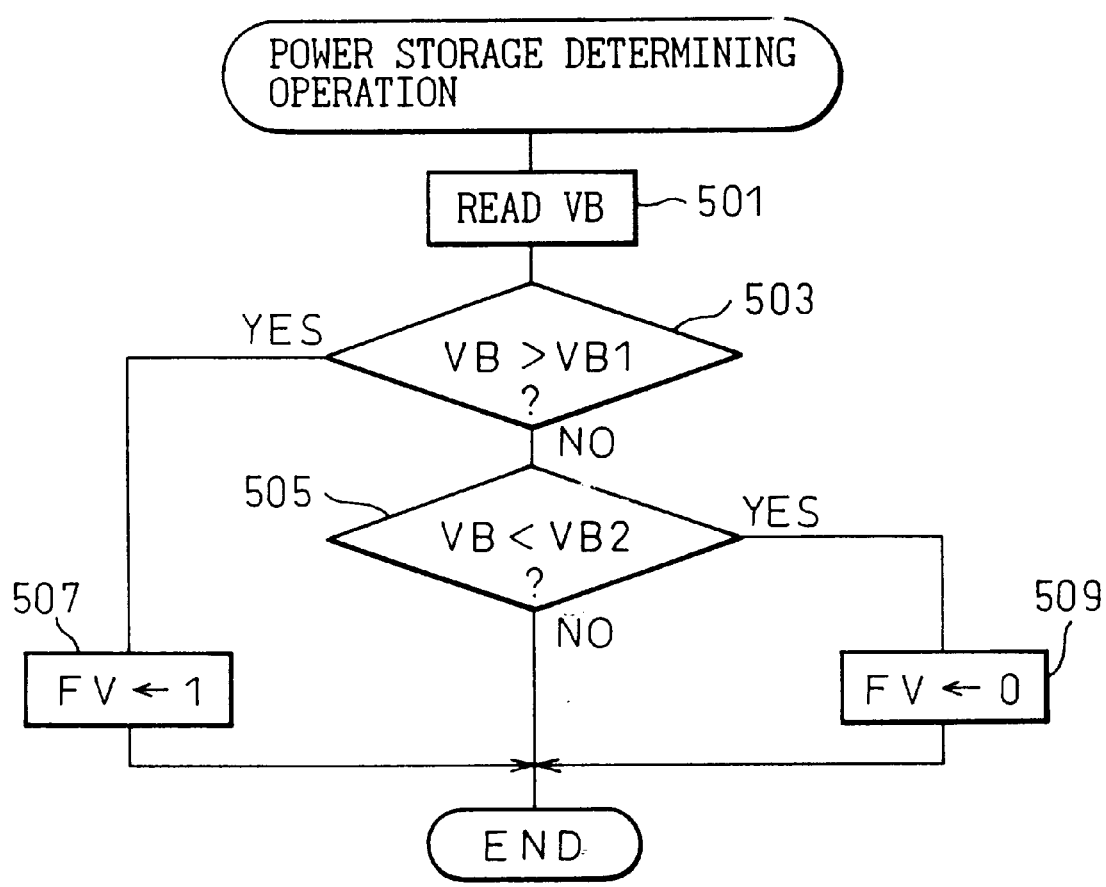
FIG. 5 is a flowchart illustrating an embodiment for determining the amount of electric power stored.

FIG. 5 is the flowchart illustrating the determining operation of the amount of electric power stored in the battery 5. The operation in FIG. 5 is performed by a routine executed by the control unit 30 at regular intervals.

In FIG. 5, the terminal voltage VB of the battery 5 is read from the voltage sensor 37. At step 503 through 509, the value of the flag FV is set according to the voltage VB. Namely, when the voltage VB is higher than a predetermined first voltage VB1, the value of the flag FV is set to 1 (step 507). When VB is lower than a predetermined second voltage VB2, the value of the flag FV is set to 0 (step 509). If VB1≧VB≧VB2, the value of the flag FV is maintained. As explained in FIG. 3, the engine 1 stops, i.e., the generation of the electric power stops when the value of the flag FV is set to 1 (steps 303, 325) and the generation of the electric power starts (i.e., the engine starts) when the value of the flag FV is set to 0. Therefore, the amount of the electric power stored in the battery 5, i.e., the terminal voltage VB of the battery 5 is always maintained within a predetermined range (VB1≧VB≧VB2).

Next, the valve failure control operation in steps 303 and 307 in FIG. 3, i.e., the control operation when either of the electromagnetic valves 2a and 2b has failed will be explained. In this embodiment, as explained later, the values of both failure flag FE1 and recovery flag FE2 are set to 1 by the operation in FIG. 6 when the failure of the electromagnetic valves 2a and 2b is detected. When the values of the flags FE1 and FE2 are set to 0, the operation in FIG. 3 performs step 325 to stop the engine 1.

Figure 6:
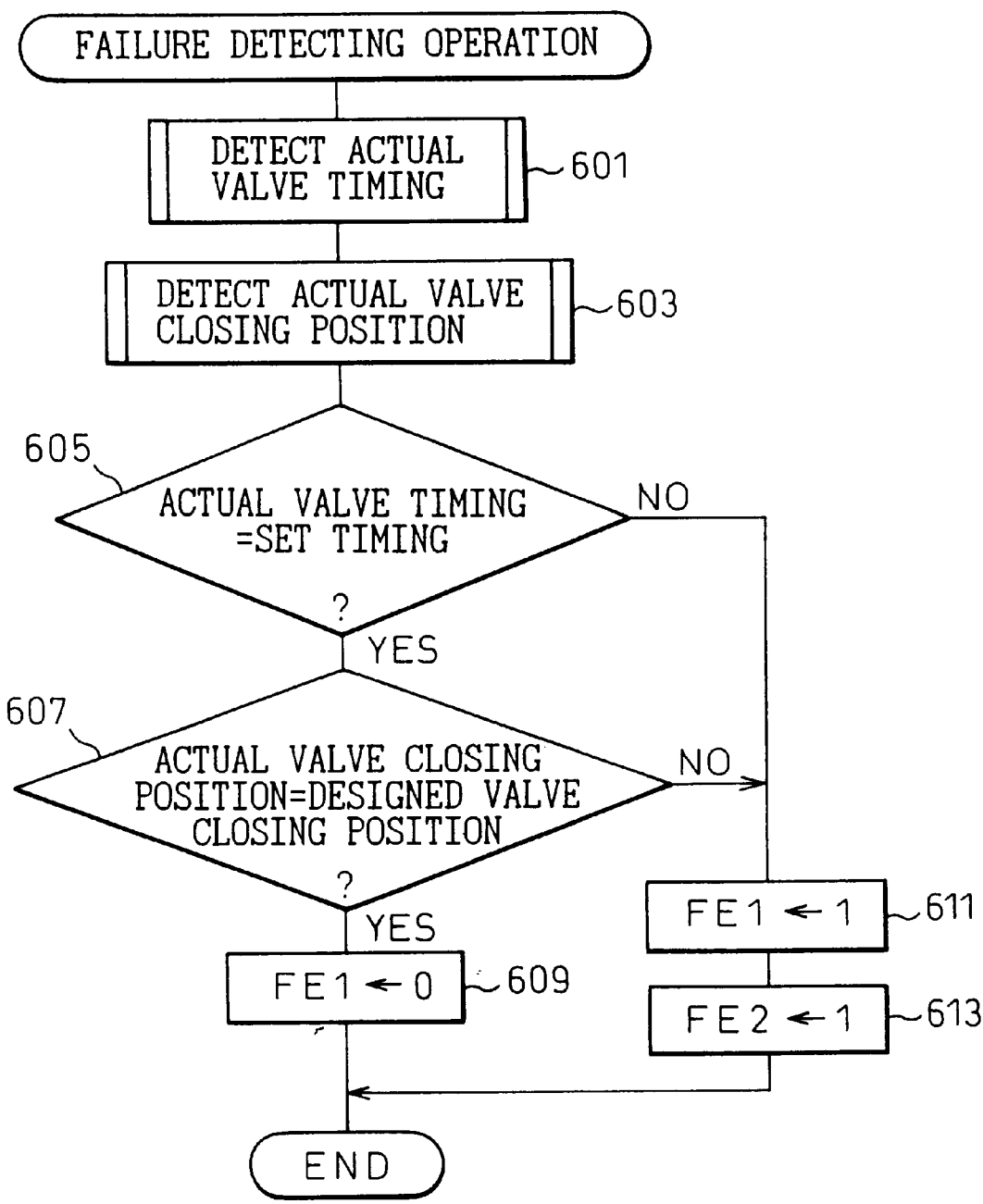
FIG. 6 is a flowchart illustrating an embodiment for detecting the failure of the electromagnetic valves.

FIG. 6 is a flowchart illustrating the operation for detecting the failure of the electromagnetic valves. This operation is performed by a routine executed by the control unit 30 at regular interval.

In FIG. 6, step 601 represent the operation for detecting the actual open/close timing of the valves 2a and 2b. The open/close timing of the valves 2a and 2b is detected by a knock sensor (a vibration sensor) attached to the cylinder block of the engine 1. The knock sensor detects the knock in the respective cylinder by the vibrations transmitted to the cylinder block. Further, since the opening and closing of the valves also generate vibrations of the cylinder head and cylinder block, the open/close timing of the valves of the respective cylinders are detected by the knock sensor. The control unit 30 extracts the vibration components corresponding to the opening/closing of the valves of the respective cylinders from the vibration detected by the knock sensor and determines the opening/closing timing of the valves based on the crank angle.

Step 603 represents the operation for determining the actual closing position of the valve elements. The actual closing position of the valve element is the position of the valve element nearest to the valve seat during the valve closing operation. In this embodiment, valve position sensors are disposed near the respective valve elements 54 in order to detect the actual closing positions of the valves 2a and 2b.

Step 605 represents the operation for determining whether a loss of synchronism has occurred in the electromagnetic valves. At step 605, the opening/closing timings of the respective valves detected at step 601 are compared with the timing set by the control unit 30, and if the actual timing of any valve does not agree with the timing set by the control unit 30, it is determined that a loss of synchronism has occurred. If a loss of synchronism has occurred, the values of the flags FE1 and FE2 are set to 1 at steps 611 and 613. If synchronism is not lost at step 605, the operation performs step 607 to determine whether the actual closing positions of the valves agree with the designed closing position of the valves. If the actual closing position of any valve does not agree with the designed closing position, since this means malfunction of the valve has occurred, the operation performs steps 611 and 613 to set the values of the flags FE1 and FE2 to 1. If a loss of synchronism or the malfunctions of the valves are not detected at steps 605 and 607, the value of the failure flag FE1 is set to 0 at step 609.

Figure 7:
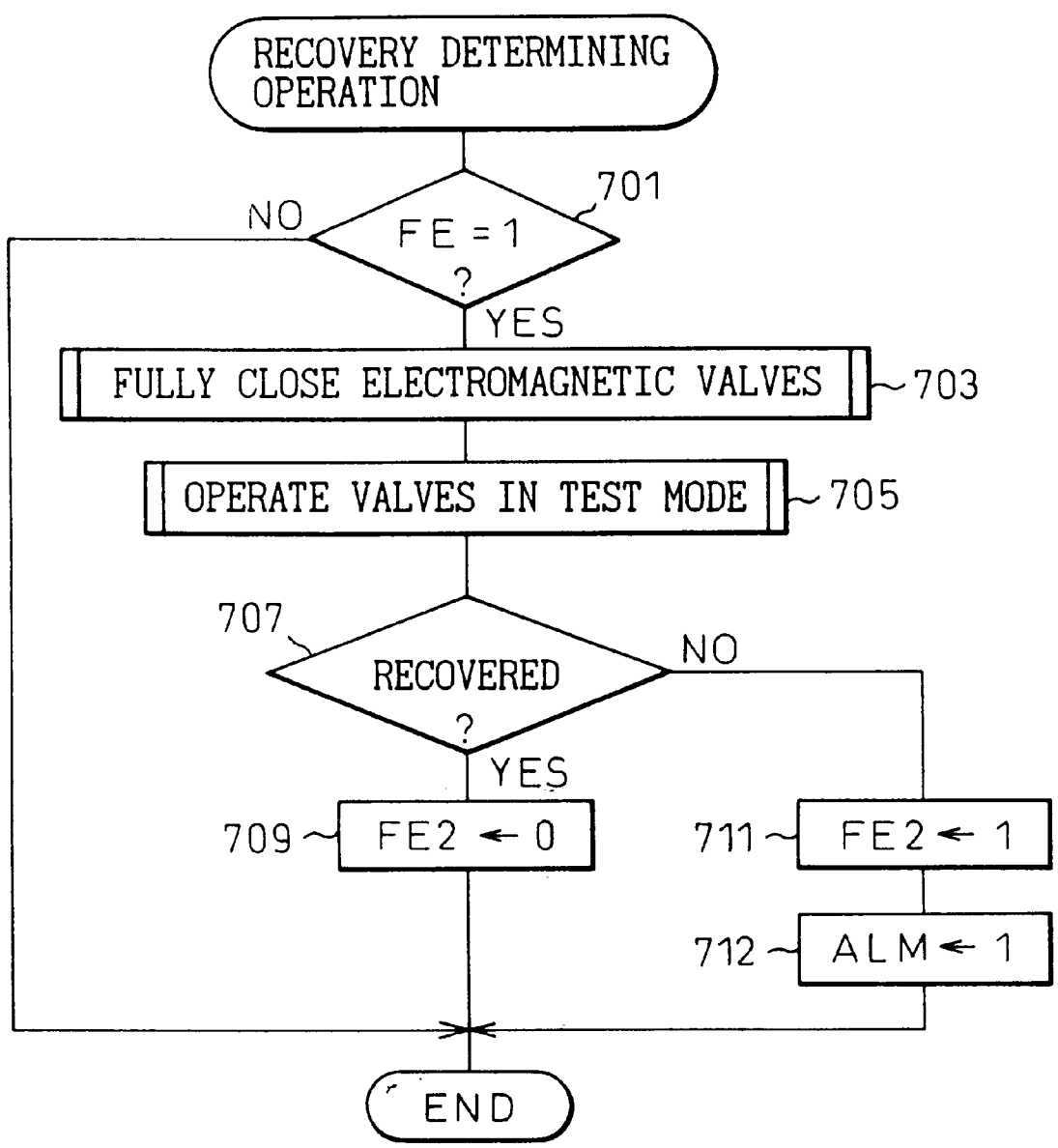
FIG. 7 is a flowchart illustrating an embodiment for determining whether the electromagnetic valves have recovered from the failure.

FIG. 7 is a flowchart illustrating the recovery determining operation of the electromagnetic valves 2a and 2b. The operation in FIG. 7 is performed by a routine executed by the control unit 30 at regular interval.

In the recovery determining operation in FIG. 7, the valves are fully closed when the failure of the valves 2a and 2b is detected, then, the valves are operated in a predetermined test operation mode. During the test mode operation of the valves, the actual closing positions and opening/closing timings are detected. If the actual closing positions and the opening/closing timings match the expected values of the test mode operation, the operation determines that the valves have recovered from the failure and sets the value of the recovery flag FE2 to 0.

Namely, at step 701 in FIG. 7, the operation determines whether the value of the failure flag FE1 is set to 1. If FE1=0 at step 701, the operation terminates without performing steps 703 through 712. If FE1=at step 701, i.e., if the engine has stopped due to the failure of the valves, the operation fully closes the valves 2a and 2a at step 703, then actuates the valves 2a and 2b from the fully closed position according to a predetermined test mode. In the test mode, the valves are opened and closed in a specific frequencies and strokes. The operation further determines whether the actual movements of the valve elements match the expected movements during the test mode operation, i.e., whether the valves have recovered from the failure at step 705 and, if it is determined that the valves have recovered from the failure, the values of the recovery flag FE2 is set to 0 at step 709. When the value of the recovery flag FE2 is set to 0, step 309 is performed in FIG. 3 to restart the engine 1, i.e., when the recovery flag FE2 is set to 0, the engine is started even though the value of the failure flag FE1 is set at 1.

On the other hand, if it is determined that the valves have not recovered from the failure at step 707, the value of the recovery flag FE2 is set to 1 at step 711, and the value of an alarm flag ALM is set to 1. When the value of the alarm flag ALM is set to 1, an alarm disposed near the driver's seat is activated by another routine executed by the control unit 30 in order to notify the driver that the valve failure has occurred.

In this embodiment, since the vehicle is driven by the electric power stored in the battery 5, the vehicle can travel a certain distance even if the engine is stopped. Further, in some cases, the electromagnetic valve recovers from the loss of synchronism or the malfunction by stopping the operation of the valves for a certain period. Therefore, by determining whether the failure of the valves are permanent after the engine has stopped due to the failure of the valves, it can be determined whether the engine can be restarted. Further, if it is determined that the valves have not recovered from the failure by the operation in FIG. 7, i.e., if it is determined that a permanent failure has occurred in the electromagnetic valves, since the driver is notified so by the alarm at step 712, the driver can bring the vehicle to a repair shop using the electric power stored in the battery 5.

Next, another embodiment of the present invention will be explained with reference to FIG. 8.

Figure 8:
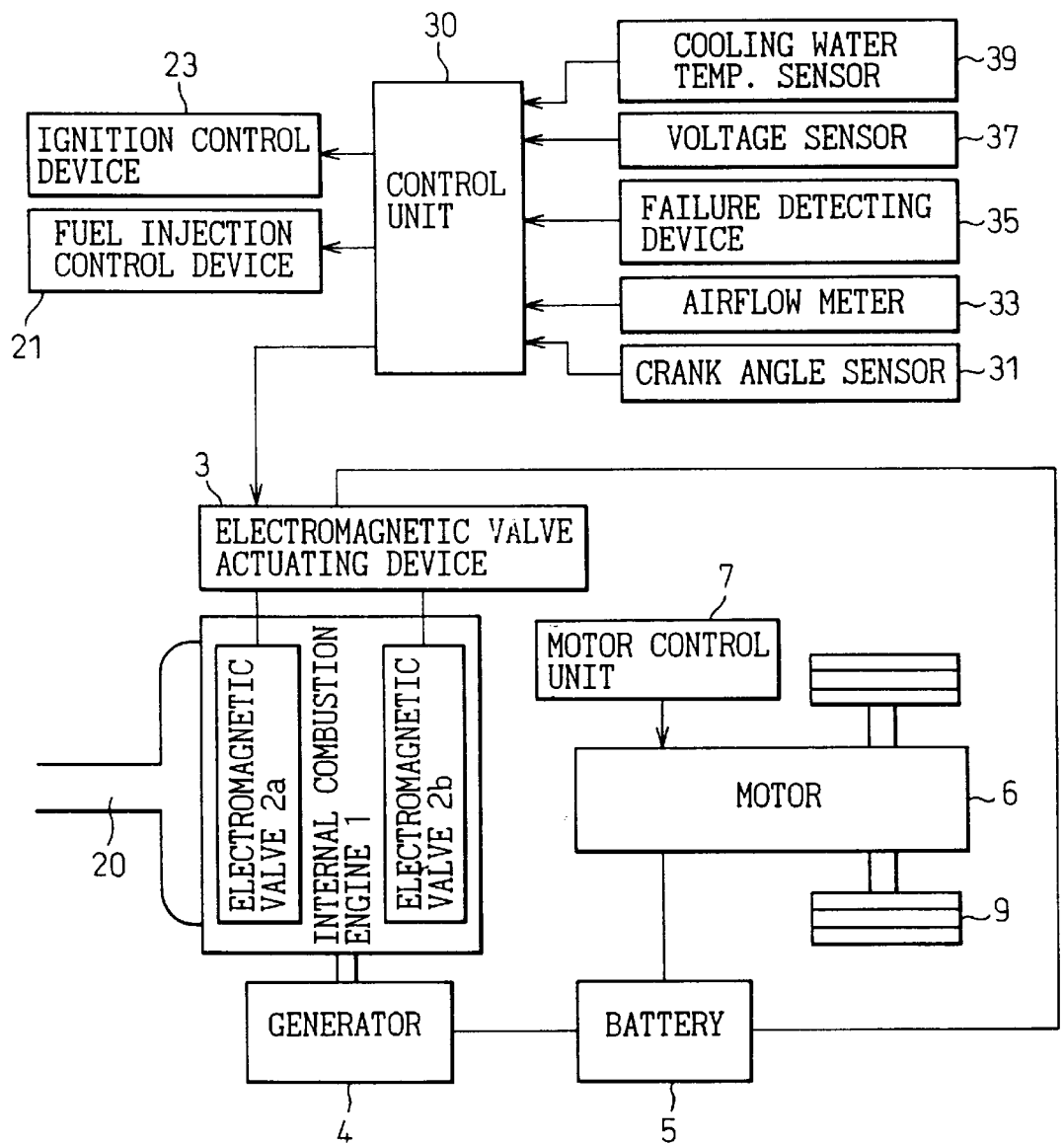
FIG. 8 is a drawing illustrating another embodiment of the power unit according to the present invention.

The configuration of the embodiment in FIG. 8 is similar to that of the embodiment in FIG. 1, except that the throttle valve is not provided in the intake air passage 20. The control unit 30 in this embodiment controls the engine speed NE within the predetermined range by adjusting the valve timing of the engine by controlling the electromagnetic valve actuating device 3. For example, when the closing timing of the intake valves is delayed, the intake valves are kept open until the middle of the compression strokes of the respective cylinders. Therefore, a part of the intake air drawn into the cylinder is expelled from the cylinder to the intake port during the compression stroke before the intake valve closes. This lowers the charging efficiency of the cylinder and reduces the amount of intake air actually charged into the cylinder. Thus, the intake air amount can be controlled by delaying the closing timing of the intake valves without using the throttle valve.

In this embodiment, the control unit 30 controls the open/closing timing of the intake valves in the similar manner as that in FIG. 4 in order to maintain the engine speed within the predetermined range. Since the engine speed is controlled without using a throttle valve, an increase in the manufacturing cost, and a complication of the system, caused by the electronic control throttle valve do not occur in this embodiment. Further, since the intake loss due to intake air throttling is eliminated in this embodiment, the fuel consumption of the engine is improved. Though no throttle valve is provided in this embodiment, a simple type throttle valve (such as an electronic control throttle valve using a low resolution type stepper motor or a mechanical type throttle valve) used only during the starting operation of the engine, or a shut off valve for stopping the engine in a short time in an emergency may be disposed in the intake air passage 20.

Further, though the operation of all the engine cylinders are stopped in the previous embodiment when the amount of the electric power stored in the battery reaches a predetermined value, the operations of some of the cylinders are maintained, i.e., a reduced cylinder number operation of the engine is carried out in this embodiment even when the amount of the store electric power reaches the predetermined value. By operating some of the cylinders, the temperatures of the engine and the exhaust gas purifying catalyst do not become low and, thereby, the startability and the exhaust emission during the re-starting of the engine are improved.

The purpose of continuing the operation of some of the cylinders when the amount of the stored electric power reaches the predetermined value is to generate heat for keeping the engine at an appropriate temperature. Thus, the cylinders operated in this condition are not required to generate output torque of the engine. Therefore, in this condition, the closing timing of the intake valves of the operating cylinders is largely delayed in order to reduces the amount of intake air fed to the cylinders and the amount of fuel supplied to the cylinders is decreased to the value near the lower limit where misfiring does not occur. Further, the cooling water temperature is detected by a cooling water temperature sensor 39 in this embodiment, and the number of the cylinders operated during the reduced cylinder number operation is increased as the engine temperature (i.e., the engine cooling water temperature) becomes lower in order to prevent the engine from being cooled. When the electromagnetic valves 2a, 2b have failed, all the cylinders are stopped also in this embodiment.

Figure 9:
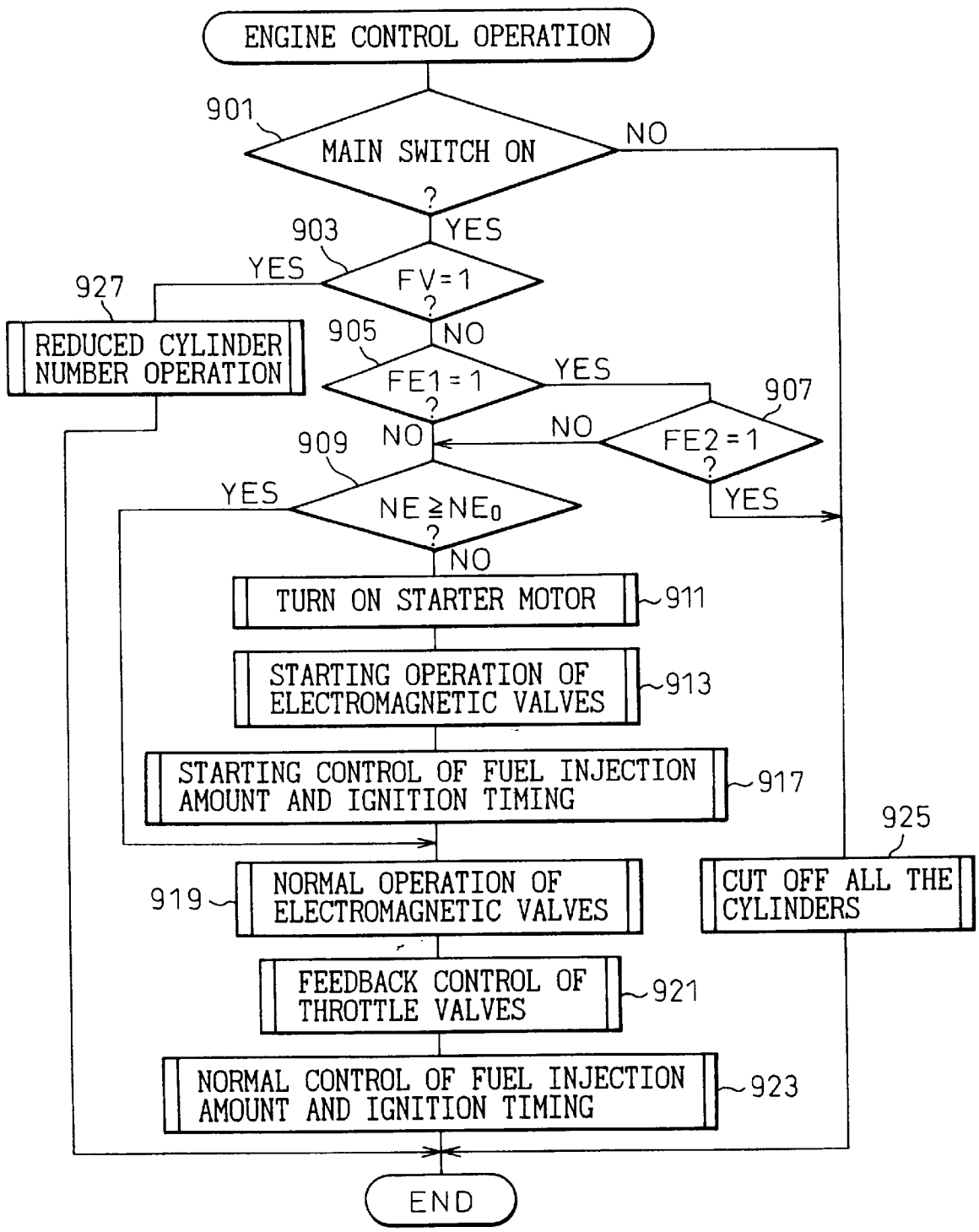
FIG. 9 is a flowchart illustrating the control operation of the engine in FIG. 8.
Figure 10:
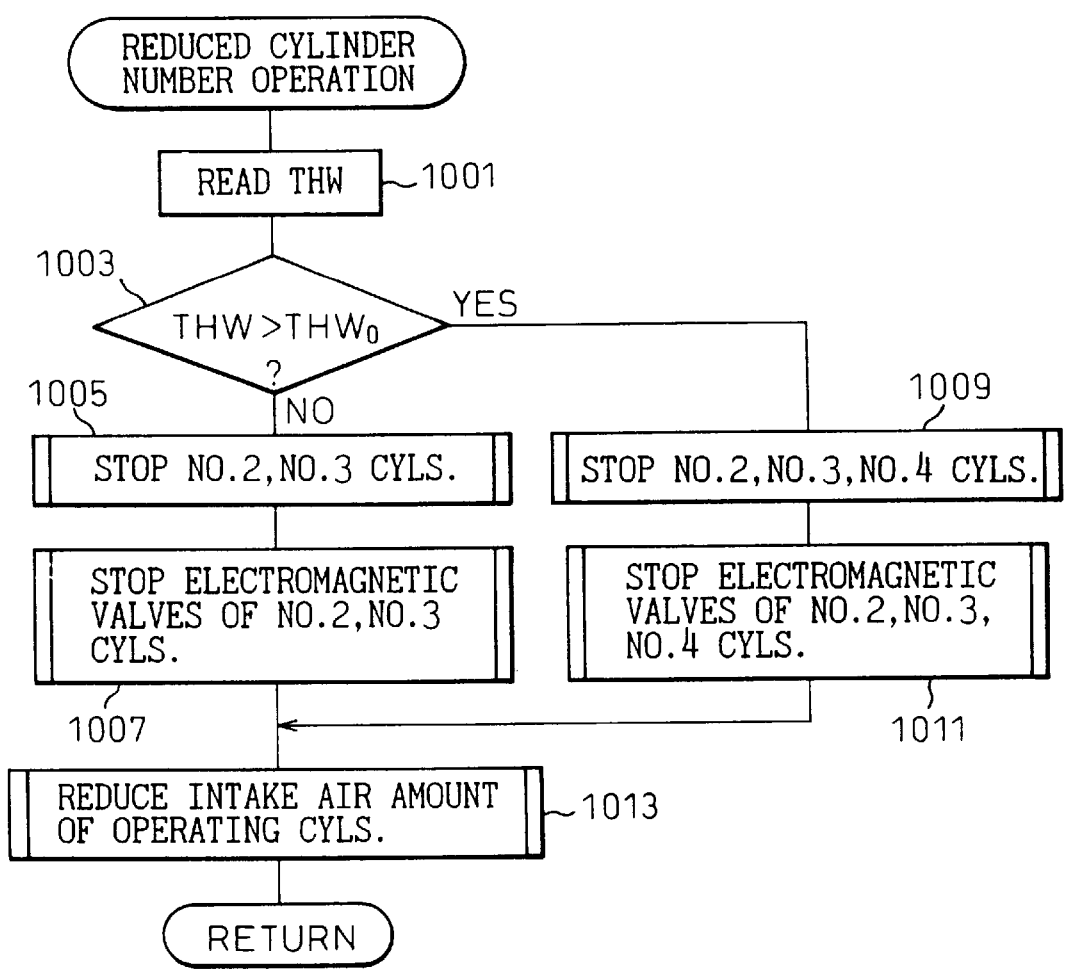
FIG. 10 is a flowchart illustrating an embodiment of the reduced cylinder number control operation of the engine.
Figure 11:
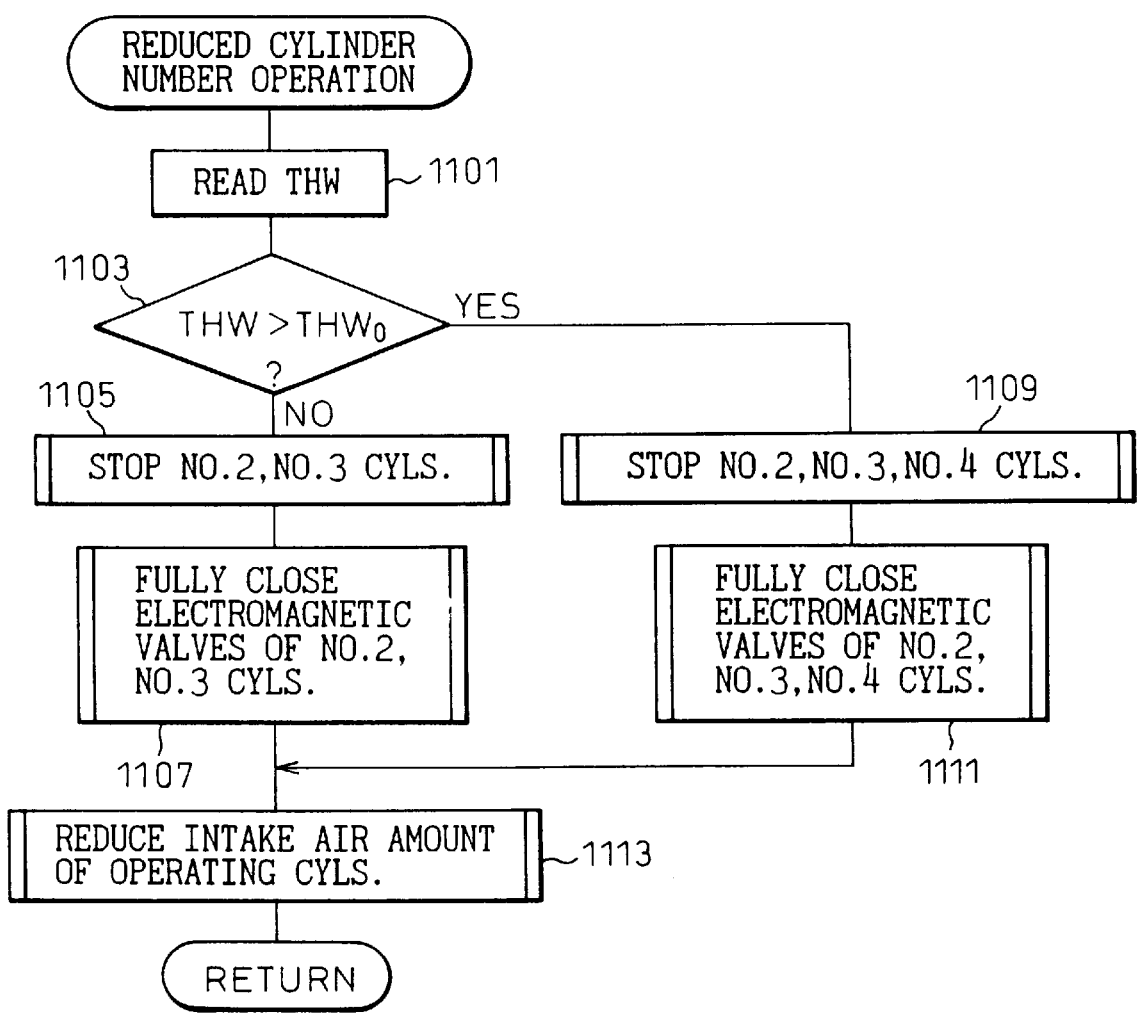
FIG. 11 is a flowchart illustrating another embodiment of the reduced cylinder number control operation of the engine.

FIGS. 9 through 11 are flowcharts for performing the operations explained above.

FIG. 9 is a flowchart illustrating the control operation of the engine 1 in this embodiment. The operation in FIG. 9 is similar to the operation in FIG. 3, except for the following points.

(a) During the engine starting operation (steps 909 through 917), the amount of intake air of the engine is controlled by the electromagnetic valves (step 913) without using throttle valve, i.e., the control of the throttle valve (step 315 in FIG. 3) is not performed during the engine starting operation.

(b) The engine speed NE is maintained within the range $NE1 \leq NE \leq NE2$ by controlling the closing timing of the electromagnetic valves 2a (the intake valves) at step 921.

(c) When the amount of the stored electric power reaches the predetermined value (i.e., when FV=1 at step 903), the reduced cylinder number operation in which only some of the cylinders of the engine operate is performed at step 927 instead of stopping the operation of all the cylinders (step 325 in FIG. 3). The number of the cylinders operated during the reduced cylinder number operation is changed in accordance with the engine cooling water temperature.

FIG. 10 is a flowchart illustrating the reduced cylinder number operation performed at step 927 in FIG. 9. In FIG. 10, the cooling water temperature THW of the engine is read from the cooling water temperature sensor 39 at step 1001. At step 1003, the operation determines whether the temperature THW is higher than a predetermined temperature $THW_0$.

If $THW \leq THW_0$ at step 1003, i.e., if the engine temperature is relatively low, the operation of two cylinders (for example, No. 1 and 4 cylinders) is continued in order to prevent the engine from being cooled and the fuel supply to the remaining two cylinders (i.e., No. 2 and 3 cylinders) is stopped at step 1005. Further, at step 1007, the operation of the electromagnetic valves 2a, 2b of the cylinders stopped at step 1005 (i.e., No. 2 and 3 cylinders) is stopped.

If THW>THW$_0$ at step 1003, i.e., if the engine temperature is relatively high, the operation of three cylinders of the engine (in this embodiment, No. 2, 3 and 4 cylinders) is stopped and the operation of only one cylinder (No. 1 cylinder) is continued. Namely, the electromagnetic valves 2a, 2b of the No. 2, 3 and 4 cylinders are stopped. After performing steps 1005, 1007 or steps 1009, 1011, the closing timing of the electromagnetic valves 2a (the intake valves) of the operating cylinder(s) is delayed in order to reduce the amount of intake air supplied to the cylinder(s). The fuel injection amount of the operating cylinder is decreased in accordance with the intake air amount and the operating cylinder(s) are operated near the misfiring limit.

FIG. 11 illustrates a modification of the reduced cylinder number operation in FIG. 10. In the reduced cylinder number operation in FIG. 10, though the operation of the electromagnetic valves of the cylinders which are stopped during the reduced cylinder number operation is stopped, the position of the valves are not controlled. Therefore, a pumping loss in the cylinder may occur if the valves are stopped at open positions. In the embodiment in FIG. 11, the valves are stopped at the fully closed position during the reduced cylinder number operation (steps 1107 and 1111). By doing so, the pumping losses of the cylinders are reduced and the fuel consumption of the engine during the reduced cylinder number operation is improved. The steps of the flowchart in FIG. 11 other than steps 1107 and 1111 are the same as the steps in FIG. 10.

Figure 12:
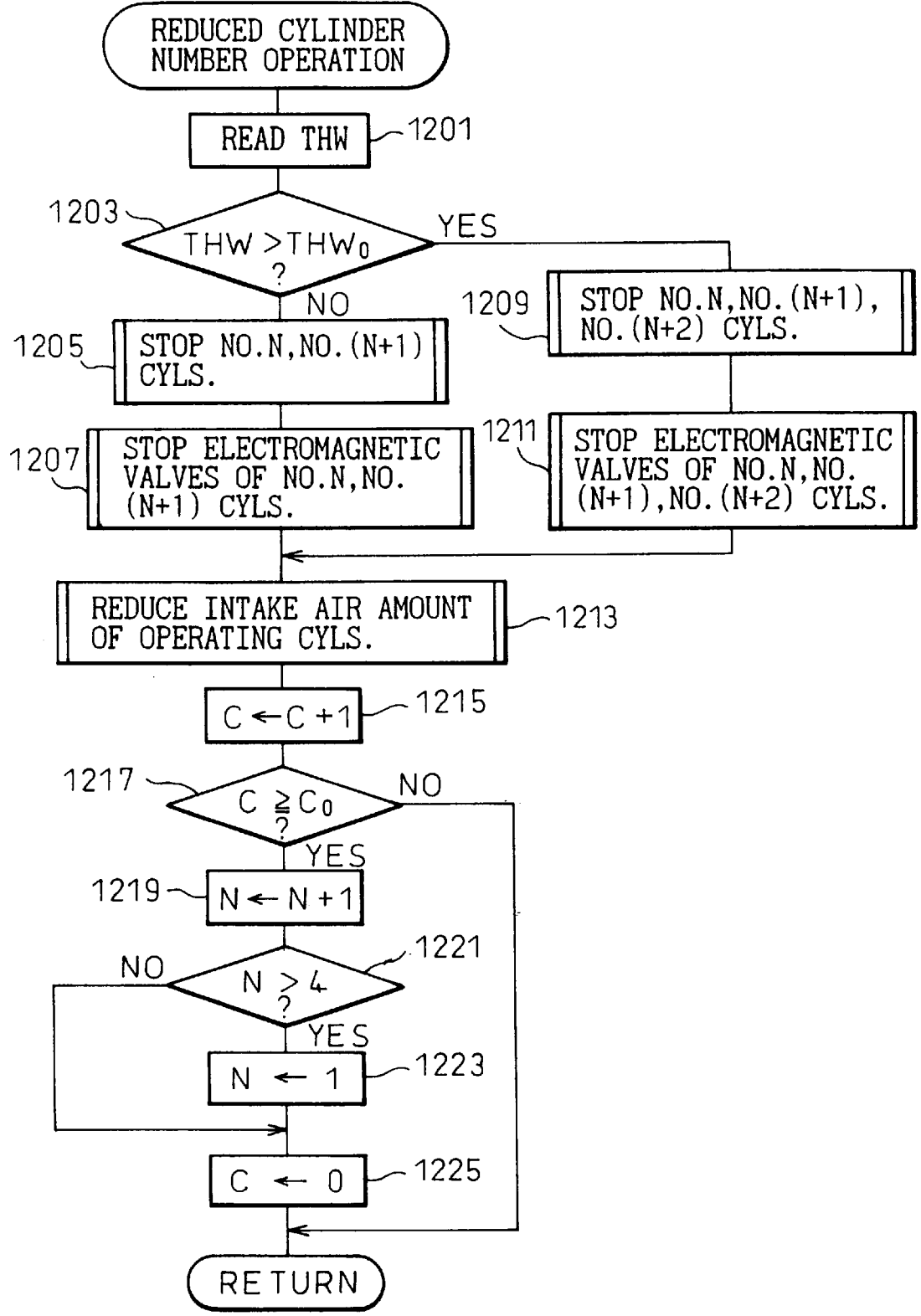
FIG. 12 is a flowchart illustrating another embodiment of the reduced cylinder number control operation which is different from those in FIGS. 11 and 12.

FIG. 12 is a modification of the embodiment in FIG. 10 which changes the operating cylinders at predetermined intervals during the reduced cylinder number operation. In the embodiment in FIGS. 10 and 11, the cylinders cut off during the reduced cylinder number operation are fixed. Therefore, in some cases, the temperature of the engine becomes high at the portion near the operating cylinders and the temperature becomes low at the portion near the cut off cylinders. Further, since the operating cylinders are fixed, deposits caused by the combustion are accumulated on the specific cylinders. Therefore, the operating cylinders are changed at predetermined intervals during the reduced cylinder number operation to maintain a uniform engine temperature and to prevent the accumulation of deposits in specific cylinders.

In FIG. 12, the cooling water temperature THW is read from the cooling water temperature sensor 39 at step 1201, and the temperature THW is compared with the predetermined value THW$_0$ at step 1203. However, in this embodiment, the cylinders cut off during the reduced cylinder number operation are not fixed. Namely, in this embodiment, No. N and N+1 cylinders (step 1205) or No. N, N+1 and N+2 cylinders (step 1209) are cut off during the reduced cylinder number operation and the value of N is increased by 1 at regular intervals (i.e., every time the value of a counter C (step 1215) reaches a predetermined value C$_0$. The maximum value of N is restricted at N=4, and when the value of N+1 and N+2 becomes 5 and 6 at steps 1205 and 1207, or at steps 1209 and 1211, respectively, No. 1 and No. 2 cylinders are cut off. Therefore, the cylinders cut off during the reduced cylinder number operation are changed at regular intervals at steps 1205 and 1207 or 1209 and 1211.

Figure 13:
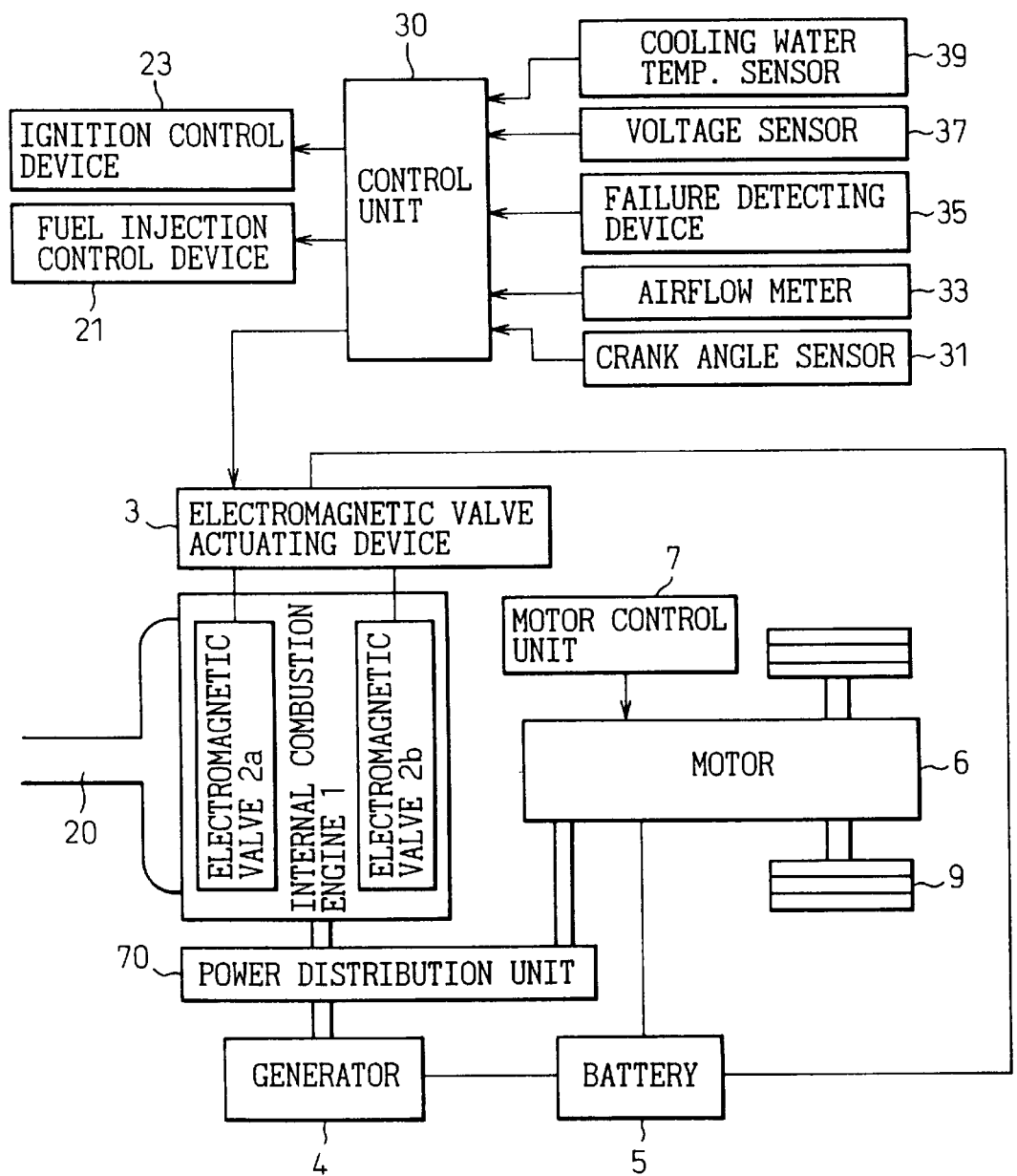
FIG. 13 is a drawing illustrating another embodiment of the power unit which is different from those in FIGS. 1 and 8.

Next, FIG. 13 shows a general configuration of another embodiment of the present invention. In the embodiment of FIGS. 1 and 8, the output shaft of the engine 1 is connected only to the generator 4 and all of the engine output is converted into electric power. However, in this embodiment, the output shaft of the engine 1 is connected to both of the generator 4 and the motor 6 via a power distribution unit 70.

Figure 14:
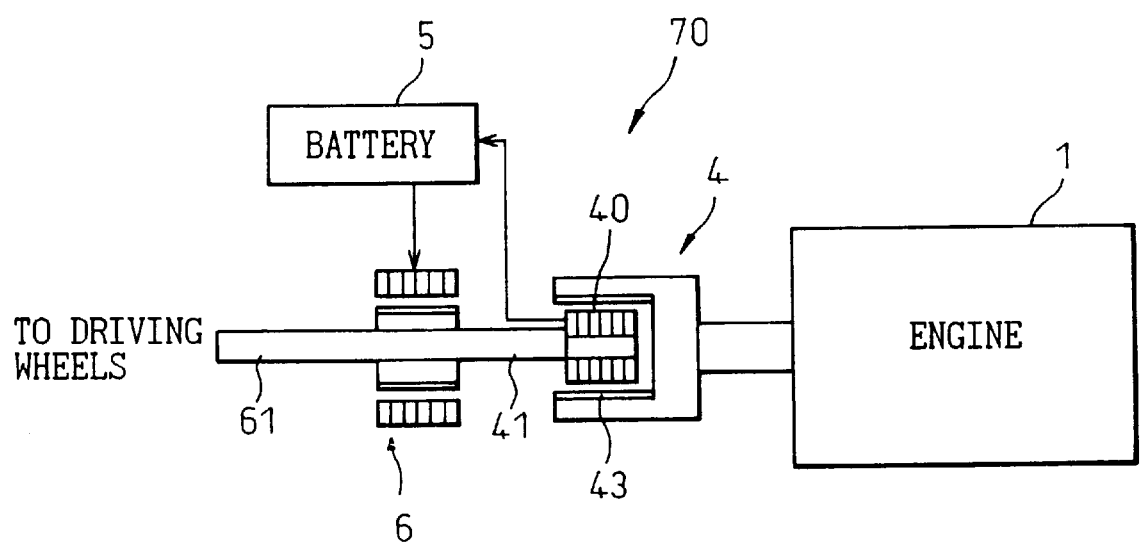
FIG. 14 is a drawing schematically illustrating an example of a power distribution unit.

FIG. 14 schematically shows the construction of the power distribution unit 70 in this embodiment. As can be seen from FIG. 14, the power distribution unit 70 directly connects the rotor shaft 41 of the generator 4 to the rotor shaft 61 of the motor 6. The engine output shaft is connected to the stator 43 of the generator 4. Namely, in this embodiment, the amount of the electric power generated by the generator 4 corresponds to the difference between the rotation speed of the rotor shaft 41 (and 61) and the rotation speed of the engine output shaft. Further, the amount of the electric power generated by the generator 4 can be controlled by adjusting exciting current fed to the rotor coil 40 of the generator 4. Namely, in-this embodiment, a part of the output of the engine 1 which corresponds to the exciting current of the coil 40 is converted into electric power by the generator 4 and the remaining portion of the output of the engine 1 is directly transmitted to the driving wheels 9 through the rotor shaft 61 of the motor 6. The electric power generated by the generator 4 is stored in the battery 5. The electric power stored in the battery is converted into the mechanical power by the motor 6. This converted mechanical power, together with the mechanical power transmitted directly from the engine output shaft is transmitted to the driving wheels 9 by the rotor shaft 61 to drive the vehicle.

In this embodiment, the control unit 30 calculates the amount of the engine output to be converted into electric power based on the engine speed, the engine load and the driving power of the vehicle required by the driver and adjusts the exciting current of the rotor coil 40 of the generator in such a manner that the required amount of the engine output is converted into electric power. Thus, the output power of the engine 1 is distributed to the generator 4 and the driving wheels 9 and the maximum operating efficiency of the engine 1 is obtained.

As explained above, according to the present invention, the advantages of the electromagnetic valve actuating device can be utilized to the maximum by combining the internal combustion engine equipped with the electromagnetic valve actuating device with an electrically powered vehicle.

We claim:

1. A power unit for a vehicle comprising:

an internal combustion engine;

an electromagnetic valve actuating device which opens and closes at least one of the intake valve and the exhaust valve of the respective cylinders of the engine by means of electromagnetic actuators;

conversion means for converting at least a part of the output power of the engine into electric power;

power storage means for storing the electric power converted by the conversion means;

driving means for converting the stored electric power into mechanical power for driving the vehicle; and vehicle control means for controlling the driving means in order to adjust the power for driving the vehicle in accordance with the requirement of the driver of the vehicle.

2. A power unit as set forth in claim 1 further comprising operation control means for controlling the internal combustion engine to a predetermined operating condition.

3. A power unit as set forth in claim 2, wherein the operation control means controls the operating speed of the internal combustion engine to within a predetermined speed range.

4. A power unit as set forth in claims 2, wherein the operation control means controls the operating condition of the engine by adjusting the degree of opening of a throttle valve disposed in the intake air passage of the engine.

5. A power unit as set forth in claims 3, wherein the operation control means controls the operating condition of the engine by adjusting the degree of opening of a throttle valve disposed in the intake air passage of the engine.

6. A power unit as set forth in claim 2, wherein the operation control means controls the operating condition of the engine by adjusting the valve timing of the engine by controlling the electromagnetic valve actuating device.

7. A power unit as set forth in claim 3, wherein the operation control means controls the operating condition of the engine by adjusting the valve timing of the engine by controlling the electromagnetic valve actuating device.

8. A power unit as set forth in claim 1 further comprising failure detecting means for detecting failure of the electromagnetic valve actuating device and failure control means for terminating the operation of the engine and for controlling the electromagnetic valve actuating device so that the device performs predetermined operations.

9. A power unit as set forth in claim 1, wherein the electromagnetic valve actuating device is supplied with electric power from the power storage means.

10. A power unit as set forth in claim 1 further comprising storage detecting means for detecting the amount of electric power stored in the power storage means and storage controlling means for stopping the combustion in, at least, one of the cylinder of the engine when the amount of the electric power stored in the power storage means has reached a predetermined value.

11. A power unit as set forth in claim 10, wherein the storage control means further stops the operation of the valves of the cylinders in which combustion is stopped by controlling the electromagnetic valve actuating device.

12. A power unit as set forth in claim 10, wherein the storage control means further keeps the valves of the cylinders in which combustion is stopped at a closed position.

13. A power unit as set forth in claim 10, wherein the storage control means changes the number of cylinders in which combustion is stopped in accordance with the temperature of the engine.

14. A power unit as set forth in claim 10, wherein the storage control means reduces the amount of the fuel supplied to the cylinders in which combustion is maintained when the amount of the stored electric power has reached the predetermined value to a value near the lower misfiring limit where misfiring occurs in the cylinders.

15. A power unit as set forth in claim 10, wherein the storage control means changes the cylinders in which combustion is stopped at predetermined intervals.

* * * * *